A. L. BAUSMAN.
CONFECTIONERY COATING MACHINE.
APPLICATION FILED APR. 19, 1919.

1,330,422. Patented Feb. 10, 1920.

WITNESS
W. C. Roe

INVENTOR.
Alonzo L. Bausman.
BY Chapin & Neal.
ATTORNEYS.

UNITED STATES PATENT OFFICE.

ALONZO LINTON BAUSMAN, OF CHICOPEE, MASSACHUSETTS, ASSIGNOR TO NATIONAL EQUIPMENT COMPANY, OF SPRINGFIELD, MASSACHUSETTS, A CORPORATION OF MASSACHUSETTS.

CONFECTIONERY-COATING MACHINE.

1,330,422.   Specification of Letters Patent.   Patented Feb. 10, 1920.

Application filed April 19, 1919. Serial No. 291,272.

*To all whom it may concern:*

Be it known that I, ALONZO LINTON BAUSMAN, a citizen of the United States of America, residing at Chicopee, in the county of Hampden and State of Massachusetts, have invented certain new and useful Improvements in Confectionery-Coating Machines, of which the following is a specification.

This invention relates to improvements in confectionery coating machines and more particularly to that class of coating machines, in which the confections are coated by being flooded with the coating material, such as chocolate, for example, which falls from a shower pan disposed above the goods.

One example of a coating machine of this general class is shown in United States Letters Patent No. 790,184, granted May 16, 1905, on an invention of Gabriel Carlson. As disclosed in such patent, the chocolate coating material is fed to a shower pan beneath which the confections to be coated are carried by a wire mesh conveyer. Chocolate issues from the shower pan through a narrow transverse slot therein and descends in a wide stream to flood the confections, the excess chocolate passing through the pervious conveyer and returning to the main receptacle for subsequent delivery to the shower pan.

It sometimes happens that the chocolate fed to the shower pan contains an occasional lump, which may lodge in the discharge slot of the shower pan and act as an obstruction to split or divide the theretofore wide unbroken stream of chocolate. This results in part of the confections not being coated or being only partly coated. Due to various other conditions, the discharge slot may become clogged or partially restricted to the detriment of the coating operation.

The object of this invention is to provide in a coating machine, and in combination with the chocolate feeding device, a means to remove obstructions from the feed opening of the device and insure that such opening is free and unrestricted for the passage of the chocolate.

More particularly, the invention has for an object to provide in combination with the shower pan of a chocolate coating machine one or more scrapers, which continuously reciprocate in the delivery opening or openings of the shower pan.

Other objects and advantages will appear in the following description and in the illustrative embodiment of the invention in the accompanying drawings, in which—

Figure 1:
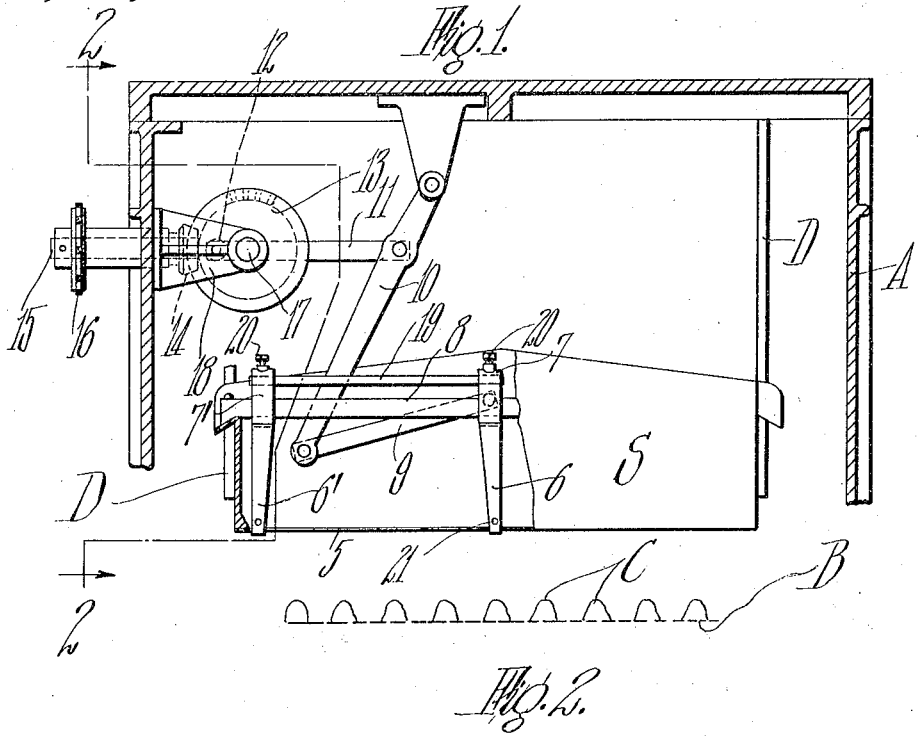
Figure 2:
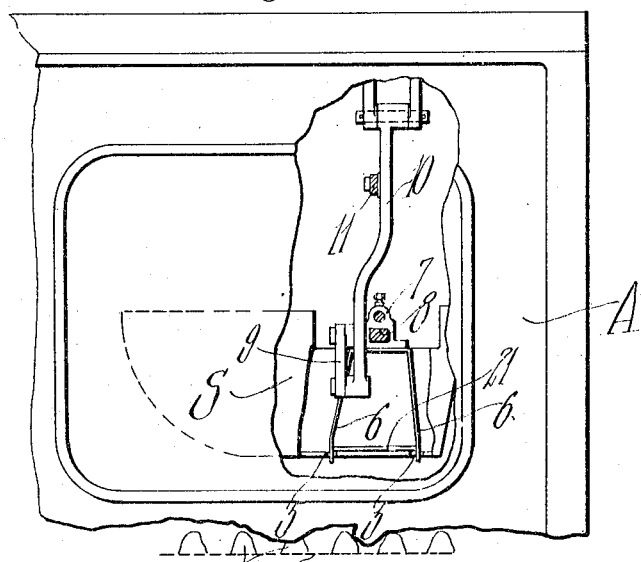

Figure 1 is a fragmentary cross-sectional view of a coating machine embodying the invention; and Fig. 2 is a fragmentary elevational view thereof with parts broken away.

Referring to these drawings, A represents the casing of a confectionery coating machine and B the wire mesh, or otherwise pervious conveyer on which confections C are carried beneath the shower pan S, which is suitably supported, as by bars D, from the casing. Chocolate, or like coating material, may be fed to pan S by any suitable means, such, for example, as those shown in the above-mentioned Carlson patent. The coating material flows from pan S through one or more slots 5, preferably at least two, as shown. The coating material falls through slots 5 in streams substantially as wide as the conveyer B and flood the confections C thereinunder, the excess coating material passing through the pervious conveyer B to be later returned to the shower pan.

It has been thought unnecessary to an understanding of the invention to illustrate the complete coating machine, as such machine is generally well understood in the art and is fully disclosed in the above-mentioned Carlson patent, to which reference is made for a disclosure of such details as the mounting of the belt and its driving mechanism, the chocolate receptacle, and the means for supplying the shower pan therefrom.

The means for maintaining the discharge slots 5 free for the passage of coating material consist of scrapers 6 which reciprocate in slots 5. Conveniently, the scrapers for both slots are formed, as shown in Fig. 2, from a single flat thin piece of metal bent into substantially the shape of an inverted U. The cross-bar portion of the U is secured to a bracket 7, which is slidable upon a guide bar 8 of substantially square cross-section. Such guide bar is fastened at its ends to the side walls of the shower pan S, as best shown in Fig. 1, and bridges across the pan to guide the scrapers 6 in parallelism with slots 5 and prevent them from turning. The two scrapers 6 are preferably held in the desired spaced relation by a cross bar 21 which connects their lower ends.

The scrapers 6 are reciprocated by the following mechanism. The bracket 7 is connected by a link 9 with the lower end of a lever 10 pivoted at its upper end to casing A. Lever 10 is connected, at a point intermediate its ends, by a link 11 to a crank pin 12 fixed on a bevel gear 13 which is driven by a bevel pinion 14. The latter is fixed to a shaft 15 rotatably mounted in casing A and on the outer end of the shaft is a sprocket wheel 16 for connection with a suitable source of power. The gear 13 is mounted on a shaft 17 which is suitably supported from casing A by means of a bracket 18.

Instead of providing one scraper, which traverses the entire length of a slot 5, it is desirable, especially where wide shower pans are used, to employ a plurality, as two, each traversing a portion only of a slot. Thus, a second pair of scrapers 6', exactly similar to those described, are mounted on a similar bracket 7', which in turn is slidable on the guide-bar 8. The bracket 7' is connected to bracket 7 by means of a rod 19. Preferably, brackets 7 and 7' are adjustably connected to rod 19, as by set screws 20. Preferably also the scrapers 6 and 6' are movable into close proximity with the right and left hand extemities, respectively, of slots 5 and the travel of each slightly overlaps that of the other, so that the entire length of each slot is subjected to the action of a scraper.

In operation, the sprocket 16 is connected to some continuously movable element of the coating machine. Therefore, the scrapers 6 and 6' will move back and forth in the slots 5 while the machine is in operation and any lumps lodging in the slots will be either removed or subdivided, and clogging of the slots from any other cause will be prevented. The scrapers loosely fit slots 5 leaving some space for the free flow of coating material so that, in practical effect, they do not impede the flow, but rather by their continuous motion keep the slots open for the free passage of the desired wide unbroken streams of chocolate.

The invention has been disclosed herein, in an embodiment at present preferred, for illustrative purposes, but the scope of the invention is defined by the appended claims rather than by the foregoing description.

What I claim is—

1. In a confectionery coating machine, a feeding device including a slot for the discharge of coating material, and movable means to traverse said slot and maintain a free passage for the coating material.

2. In a confectionery coating machine, a feeding device including a slot for the discharge of coating material, and devices movable in spaced relation longitudinally of said slot to maintain an unobstructed passage for the discharge of said material.

3. In a confectionery coating machine, a feeding device including two spaced parallel slots for the discharge of coating material, a member reciprocable in parallel relation with said slots, and a forked-like device carried by said member and having a portion depending into each slot, whereby the latter may be maintained unobstructed for the discharge of coating material.

ALONZO LINTON BAUSMAN.